Sept. 8, 1959      P. N. THOMAS      2,903,421
REMOVAL OF WATER FROM OIL DURING STORAGE
Filed July 5, 1956
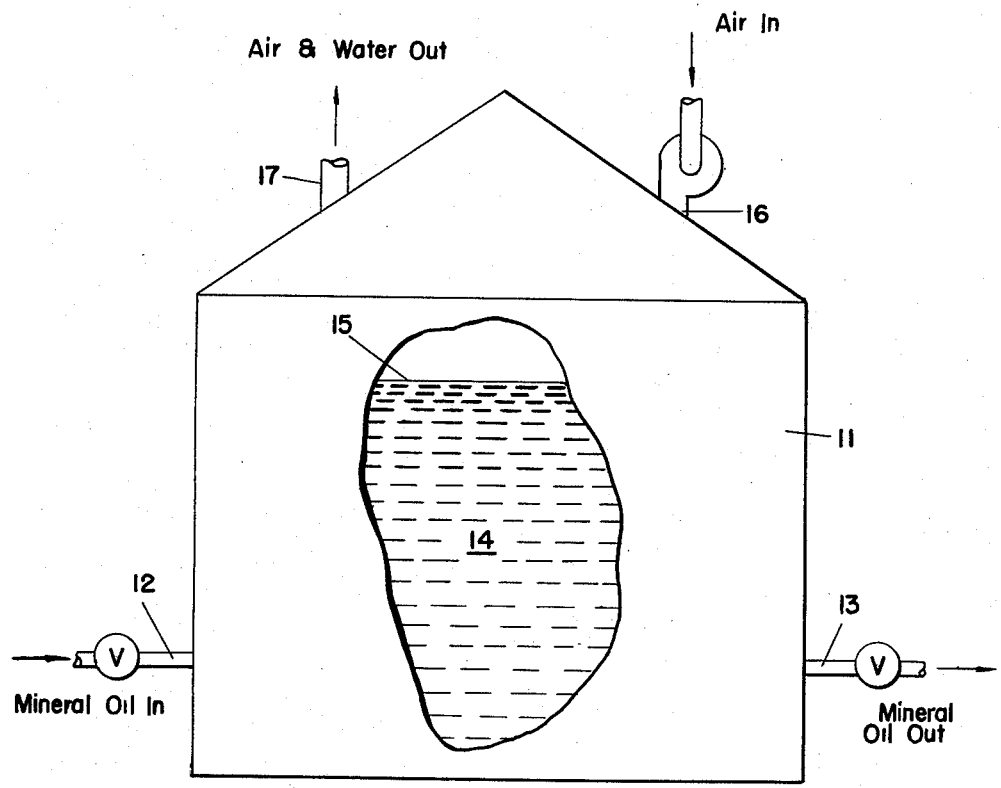
INVENTOR.
PHILIP N. THOMAS
BY Roberto Spindle
ATTORNEY

United States Patent Office 2,903,421
Patented Sept. 8, 1959

2,903,421

REMOVAL OF WATER FROM OIL DURING STORAGE

Philip N. Thomas, Wilmington, Del., assignor to Sun Oil Company, Philadelphia, Pa., a corporation of New Jersey Application July 5, 1956, Serial No. 595,921

1 Claim. (Cl. 208—187)

This invention relates to removing water from mineral oil during storage by passing a stream of air above the surface of the oil.

The presence of water in mineral oil is usually undesirable and deleterious. Water imparts unwanted cloudiness or haziness to the oil, and water adversely affects the suitability of the oil in certain applications. The removal of water from mineral oil is an importance problem in petroleum refining.

In certain petroleum refinery practice, water is removed from mineral oil by holding the oil in storage to settle and/or evaporate the water. Such practice is disadvantageous, however, in that long storage periods are required for substantial water removal. It has been proposed in the prior art to remove water from mineral oil during storage by passing a stream of air up through the body of the stored liquid. This prior procedure greatly increased undesirable oxidation of the stored oil, however.

In accordance with the present invention, water is removed from stored mineral oil by passing a stream of air over the surface of the stored oil. Practice of this invention results in greatly decreased storage time for the water removal with a minimum of oil oxidation.

Non-volatile mineral oil fractions are treated in accordance with this invention. By non-volatile is meant mineral oil fractions boiling mainly above about 400° F. Treatment of lower boiling fractions by the invention might cause excessive hydrocarbon losses through vaporization, and might cause hazardous operating conditions. Distillate fuel oil is especially advantageously treated in accordance with this invention.

Reference is now made to the accompanying drawing which illustrates in diagrammatic form a practice of the invention. Referring to the drawing, storage tank 11 is any tank suitable for storing a substantial body of mineral oil 14. Means 12 and 13 are provided respectively for introducing oil into the tank and removing oil from the tank from time to time.

As shown in the drawing, tank 11 contains mineral oil 14, which is contaminated with water. The surface of the contained mineral oil is at 15 when the contained body of oil is stored under storage conditions, i.e., when oil is not being introduced or withdrawn as above indicated, so that the confined liquid body is stationary and has substantial depth. Positioned above the surface 15 of the mineral oil are means 16 for introducing air into the tank above the oil surface, and means 17 for removing the so-introduced air from tank 11. As shown in the drawing, means 16 and 17 are positioned in the roof of tank 11. These means need not be so-positioned; they can be positioned in the walls of the tank. It is necessary only that they be above the surface of the stored oil.

Means 16 for introducing air into tank 11 as shown comprises a conduit with a blower therein adapted to force air into the tank. Equivalent devices can be used to introduce air into the tank. Means 17 comprises a conduit adapted to transport air and water vapor which is removed from the mineral oil from tank 11. Conduit 17 is vented directly to the atmosphere.

The air can be introduced into tank 11 and passed over the surface of the oil continuously or periodically. Usually it is preferred to circulate air over the oil only until the water is removed. Elevating the temperature of the oil in storage during practice of the invention improves the rate at which the water is removed from the oil although care must be taken to avoid excessive oil vaporization at the elevated temperature.

The following example illustrates the invention:

Distillate petroleum fuel oil had a cloudy appearance due to the presence of water therein. Three samples of the fuel oil were stored at room temperature under different conditions, and the appearance of the oil was checked at intervals. The following table shows the conditions of storage and the results obtained:

| Sample | Storage Conditions | Appearance of Sample | | | | |
|---|---|---|---|---|---|---|
| | | 4 hrs. | 6 hrs. | 24 hrs. | 48 hrs. | 96 hrs. |
| 1 | Sealed | Cloudy | Cloudy | Cloudy | Cloudy | Cloudy. |
| 2 | Vented to air | do | do | do | Clear | |
| 3 | Air circulated above oil. | Partly Cloudy. | Clear | | | |

The above results show that circulating air above the surface of the stored oil greatly improved the rate at which water was removed therefrom as evidenced by the rapid improvement in appearance of the sample having air circulated above while in storage.

I claim:

The method of removing water from non-volatile mineral oil fractions which comprises: confining a non-volatile mineral oil fraction containing dispersed water in an amount that renders the oil hazy as a stationary liquid body of substantial depth in a storage vessel under storage conditions; introducing into said storage vessel at a level above the surface of the stored mineral oil fraction, a stream of air under forced-draft; passing said stream of air over the surface of the stored mineral oil fraction whereby water contained in the oil is caused to vaporize and diffuse into the stream of air; and removing from said storage vessel at a level above the surface of the stored oil the stream of air containing the water vapor.

References Cited in the file of this patent

UNITED STATES PATENTS

| 1,351,042 | Jones | Aug. 31, 1920 |
| 1,438,048 | Marsh | Dec. 5, 1922 |
| 1,607,898 | Lindsay | Nov. 23, 1926 |
| 2,138,985 | Seestedt et al. | Dec. 6, 1938 |
| 2,342,723 | Buttner et al. | Feb. 29, 1944 |